US009869292B2

(12) United States Patent
Kang

(10) Patent No.: US 9,869,292 B2
(45) Date of Patent: Jan. 16, 2018

(54) SYSTEM FOR CONTROLLING WATER TURBINE GENERATOR FOR WATERWORKS

(71) Applicant: LSIS CO., LTD., Anyang-si, Gyeonggi-do (KR)

(72) Inventor: Min Gu Kang, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 230 days.

(21) Appl. No.: 14/642,428

(22) Filed: Mar. 9, 2015

(65) Prior Publication Data

US 2015/0260151 A1    Sep. 17, 2015

(30) Foreign Application Priority Data

Mar. 17, 2014  (KR) .................... 10-2014-0030940

(51) Int. Cl.
  *F03B 15/16*  (2006.01)
(52) U.S. Cl.
  CPC ....... *F03B 15/16* (2013.01); *F05B 2270/3011* (2013.01); *F05B 2270/3013* (2013.01);
  (Continued)
(58) Field of Classification Search
  CPC ........ F03B 15/16; Y02E 10/226; Y02E 10/28; F05B 2270/3011; F05B 2270/3013; F05B 2270/703
  See application file for complete search history.

(56) References Cited

U.S. PATENT DOCUMENTS

| 3,056,036 | A | * | 9/1962 | Gardner | ................. | F01D 13/00 |
| | | | | | | 290/4 R |
| 3,848,171 | A | * | 11/1974 | Speth | ..................... | F03B 15/02 |
| | | | | | | 290/52 |

(Continued)

FOREIGN PATENT DOCUMENTS

| CN | 202689160 | 1/2013 |
| KR | 10-2001-0000350 | 1/2001 |

(Continued)

OTHER PUBLICATIONS

State Intellectual Property Office of the People's Republic of China Application Serial No. 201510195289.1, Office Action dated Oct. 9, 2016, 6 pages.

(Continued)

*Primary Examiner* — Carlos Ortiz Rodriguez
(74) *Attorney, Agent, or Firm* — Lee, Hong, Degerman, Kang & Waimey PC

(57) ABSTRACT

Disclosed is a system for controlling a water turbine generator for waterworks, which monitors and controls a plurality of water turbine generators, provided in a water pipe, for waterworks in real time to integratedly operate the water turbine generators, contributes to stably generate and secure power, and increases an efficiency of the water turbine generators through integrated management. The system for controlling a water turbine generator for waterworks includes an integration control system configured to establish a power generation driving plan, based on a target amount of energy collected by a plurality of water turbine generators and a driving range of each of the plurality of water turbine generators, and a power generation unit configured to generate power through generation of power by a water turbine according to control based on the power generation driving plan, measure an amount of generated power, an amount and a pressure of water flowing into the (Continued)

plurality of water turbine generators, and an amount and a pressure of water flowing out from the plurality of water turbine generators, and supply a result of the measurement to the integration control system.

3 Claims, 2 Drawing Sheets

(52) U.S. Cl.
CPC ....... *F05B 2270/703* (2013.01); *Y02E 10/226* (2013.01); *Y02E 10/28* (2013.01)

(56) References Cited

U.S. PATENT DOCUMENTS

| | | | | |
|---|---|---|---|---|
| 4,025,228 A | * | 5/1977 | Lieber | F03B 13/08 415/205 |
| 4,496,845 A | * | 1/1985 | Ensign | F03B 15/12 290/43 |
| 7,768,146 B2 | * | 8/2010 | Balzano | F03B 13/00 290/43 |
| 8,016,548 B2 | * | 9/2011 | Ziegenfuss | F03B 13/10 415/118 |

FOREIGN PATENT DOCUMENTS

| | | |
|---|---|---|
| KR | 10-2009-0065502 | 6/2009 |
| KR | 20090065502 | 6/2009 |
| KR | 10-2009-0096587 | 9/2009 |
| KR | 10-1307656 | 9/2013 |
| KR | 101307656 | 9/2013 |
| KR | 10-1363264 | 2/2014 |
| KR | 101363264 | 2/2014 |

OTHER PUBLICATIONS

Korean Intellectual Property Office Application Serial No. 10-2014-0030940 Office Action dated Feb. 2, 2015, 4 pages.

* cited by examiner

SYSTEM FOR CONTROLLING WATER TURBINE GENERATOR FOR WATERWORKS

CROSS-REFERENCE TO RELATED APPLICATION

Pursuant to 35 U.S.C. §119(a), this application claims the benefit of earlier filing date and right of priority to Korean Application No. 10-2014-0030940, filed on Mar. 17, 2014, the contents of which is incorporated by reference herein in its entirety.

BACKGROUND OF THE DISCLOSURE

1. Field of the Disclosure

The present disclosure relates to a system for controlling a water turbine generator for waterworks, and particularly, to a system for controlling a water turbine generator for waterworks, which monitors and controls a plurality of water turbine generators, provided in a water pipe, for waterworks in real time to integratedly operate the water turbine generators, contributes to stably generate and secure power, and increases an efficiency of the water turbine generators through integrated management.

2. Background of the Disclosure

Waterworks are facilities that are essential city-based facilities and supply drinking water or industrial water through a pipe. A hydroelectric power generation system for waterworks generates energy of water, flowing in a water pipe, through a water turbine.

Patent documents of hydroelectric power generation systems for waterworks include Korean Patent Publication No. 10-2009-0065502 disclosing "infinite hydroelectric power generator using large water pipe" and Korean Patent Publication No. 10-2001-0000350 disclosing "electrical product system exploited flowing water of water pipe"

In a related art hydroelectric power generation system for waterworks, a water turbine is simply provided in a water pipe and generates electricity. However, water supplied from a purification plant is distributed to homes, and thus, a water pressure desired by each home is not considered at all. For this reason, the related art hydroelectric power generation system for waterworks cannot actually be used.

This is because a pressure of water passing through a water turbine is rapidly reduced, and for this reason, it is unable to satisfy a water pressure desired by each home.

Waterworks start from each purification plant and are connected to each home like a spider's web.

To describe a general water pipe provided in each home with reference to FIGS. 1 to 3, the general water pipe includes a branch pipeline 10 that branches from a purification plant to each home and is connected to each home, a pressure reducing valve 11 that reduces a pressure to be suitable for a water pressure desired by each home, a first opening/closing valve 12 that connects and blocks a flow of water, a bypass pipeline 20 in which both ends of the bypass pipeline 20 are disposed in the branch pipeline 1 so as to bypass the first opening/closing valve 12 and the pressure reducing valve 11, and a second opening/closing valve 21.

Generally, as illustrated in FIG. 2, the second opening/closing valve 21 disposed in the bypass pipeline 20 is in a blocked state, and the first opening/closing valve 21 disposed in the branch pipeline 10 is in an open state.

Therefore, when it is assumed that water flows through the branch pipeline 10, a pressure of water before passing through the pressure reducing valve 11 is 5 kfg/cm², and a water pressure desired by each home is 2 kgf/cm², the pressure reducing valve 11 reduces the pressure of the water by 3 kgf/cm² and supplies the pressure-reduced water to each home.

Here, the bypass pipeline 20 is provided for responding to a case in which water cannot be transferred to the branch pipeline 10 due to a breakdown or a damage of the pressure reducing valve 11. In this case, as illustrated in FIG. 3, water flows through the bypass pipeline 20 instead of the branch pipeline 10.

If a configuration of the general water pipe is ignored and a water turbine is simply provided in a water pipe as disclosed in the above-described patent documents, a pressure of water passing through a water turbine is rapidly reduced, and for this reason, water passing through the branch pipeline 10 cannot be supplied at a water pressure desired by each home.

As a related art for solving the above-described problem, there is a hydroelectric power generation system for waterworks disclosed in Korean Patent Registration No. 10-1307656.

In the hydroelectric power generation system for waterworks disclosed in Korean Patent Registration No. 10-1307656, a pressure control value and an additional pipeline are provided in a related art water pipeline, and a water turbine power generator is provided in the additional pipeline, thereby supplying water at a water pressure desired by each home through the pressure control valve. Also, the hydroelectric power generation system for waterworks generates power by collecting surplus energy in which a pressure is reduced by a pressure reducing value which is provided in waterworks.

Since a related art is designed to operate within a specific range of a water pressure or an amount of water, a driving range of a water turbine in a waterworks network is limited to a design specification range.

Under a condition out of a driving range of a water turbine of a water pressure/water amount condition, the water turbine is physically damaged, and an amount of collected energy lacks. In a related art, it is difficult to collect certain energy at a point where the water pressure/water amount condition is largely changed.

Moreover, waterworks are provided in a complicated network form in a city. Recently, with the unmanned/automated trend, it is required to establish a system which is integratedly operated and managed at a long distance.

SUMMARY OF THE DISCLOSURE

Therefore, an aspect of the detailed description is to provide a system for controlling a water turbine generator for waterworks, which monitors and controls a plurality of water turbine generators, provided in a water pipe, for waterworks in real time to integratedly operate the water turbine generators, stably produces and secures power, and increases an efficiency of the water turbine generators through integrated management.

To achieve these and other advantages and in accordance with the purpose of this specification, as embodied and broadly described herein, a system for controlling a water turbine generator for waterworks includes: an integration control system configured to establish a power generation driving plan, based on a target amount of energy collected by a plurality of water turbine generators and a driving range of each of the plurality of water turbine generators; and a power generation unit configured to generate power through generation of power by a water turbine according to control based on the power generation driving plan, measure an amount of generated power, an amount and a pressure of water flowing into the plurality of water turbine generators, and an amount and a pressure of water flowing out from the plurality of water turbine generators, and supply a result of the measurement to the integration control system.

The power generation unit may include: a power generation control unit configured to control generation of power by the water turbine according to the power generation driving plan; and a water turbine power generation unit configured to generate power according to control by the power generation control unit, wherein the water turbine power generation unit includes: a branch pipeline connected to each home, and configured to branch from a purification plant to each home; a plurality of water turbine pipelines connected to the branch pipeline in parallel; a water turbine generator disposed in each of the plurality of water turbine pipelines; and a front valve and a rear valve respectively disposed at a front end and a rear end of the water turbine generator, and configured to be controlled according to control by the power generation control unit.

The water turbine power generation unit may include: a front measurement apparatus disposed between the water turbine generator and the front valve, and configured to measure an amount and a pressure of water flowing into the water turbine generator; and a rear measurement apparatus disposed at an outlet side of the rear valve, and configured to measure an amount and a pressure of water flowing out from the water turbine generator.

The water turbine power generation unit may further include a branch water turbine pipeline configured to connect two adjacent water turbine pipelines. Also, one end of the branch water turbine pipeline may be connected between the water turbine generator and the front valve which are disposed in a front water turbine pipeline, and the other end of the branch water turbine pipeline may be connected between the water turbine generator and the rear valve which are disposed in a rear water turbine pipeline.

The water turbine power generation unit may further include a branch valve disposed in the branch water turbine pipeline, and configured to operate according to control by the power generation control unit.

The system may further include a flowmeter disposed in the branch pipeline, and configured to measure an amount of water flowing through the water turbine power generation unit and transfer the measured amount of water to the power generation control unit.

The integration control system may receive and use the amount of generated power, the amount and the pressure of water flowing into the plurality of water turbine generators, and the amount and the pressure of water flowing out from the plurality of water turbine generators in establishing the power generation driving plan.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
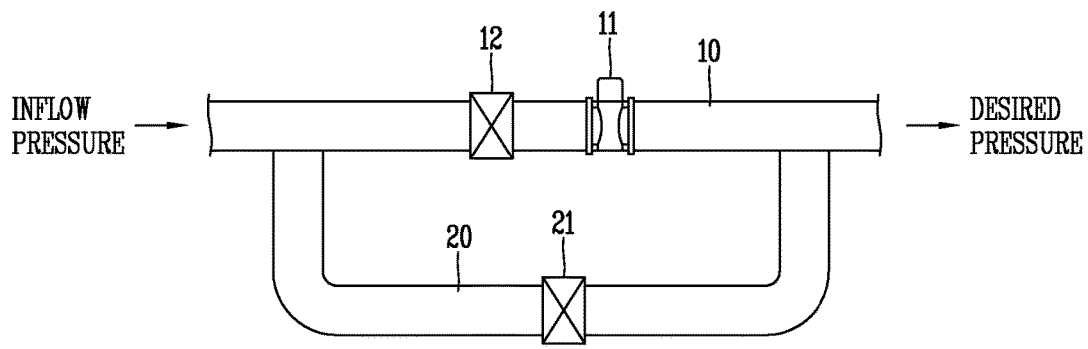
FIG. 1 is a diagram illustrating a configuration of a general water pipe which branches from a purification plant and is provided in each home.
Figure 2:
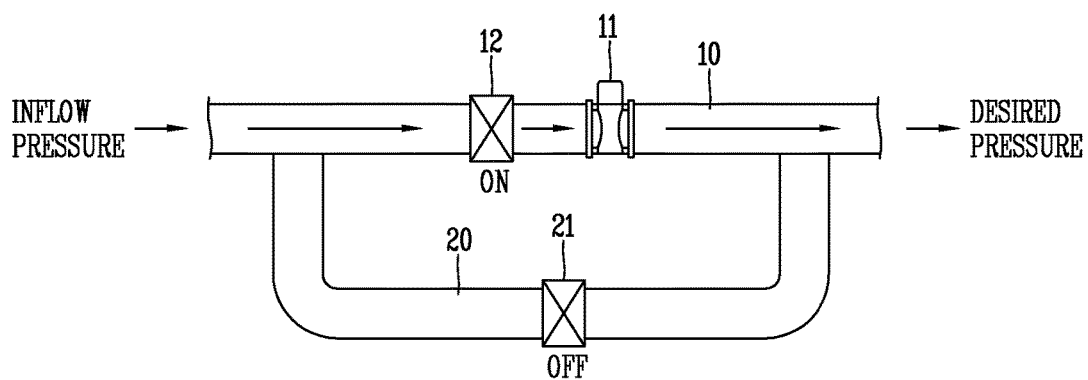
FIG. 2 is a diagram illustrating a state in which water flows through a branch pipeline of the water pipe of FIG. 1.
Figure 3:
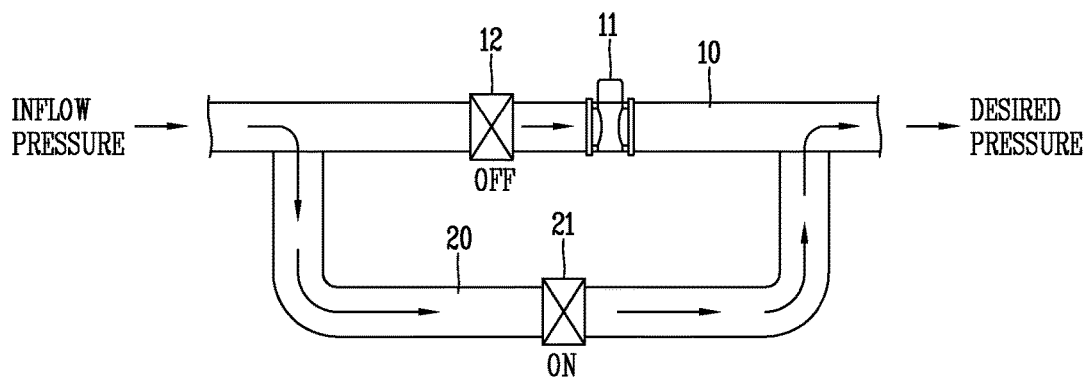
FIG. 3 is a diagram illustrating a state in which water flows through a bypass pipeline of the water pipe of FIG. 1.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, the present invention will be described in detail such that those of ordinary skill in the art can easily implement the present invention through embodiments which will be described below with reference to the accompanying drawings.

In the drawings, the sizes or shapes of elements may be exaggeratedly illustrated for clarity and convenience of description. Also, terms used herein are terms that have been defined in consideration of functions in embodiments, and the terms that have been defined as described above may be altered according to the intent of a user or operator, or conventional practice, and thus, the terms should be defined on the basis of the entire content of this specification.

Figure 4:
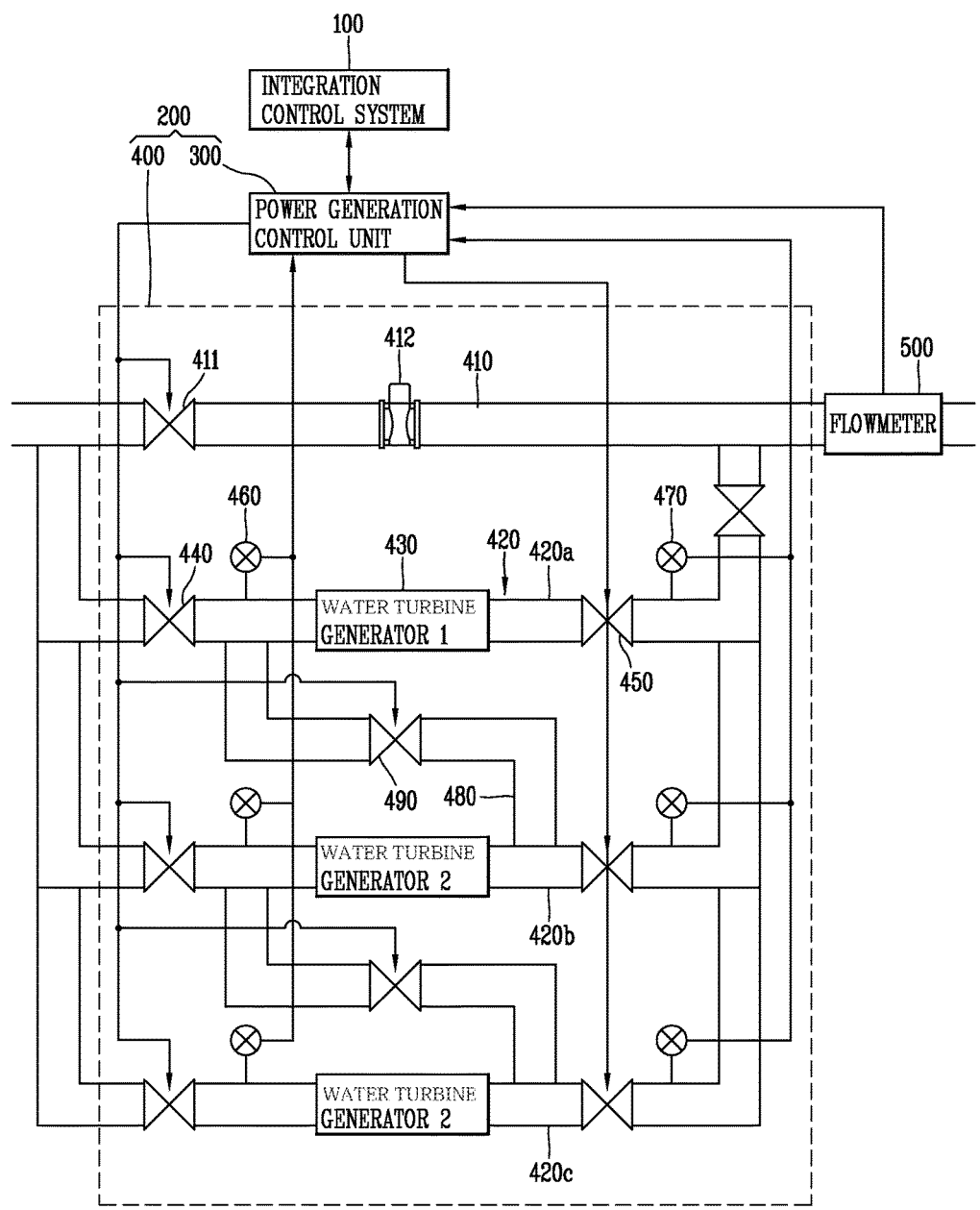
FIG. 4 is a diagram illustrating a system for controlling a water turbine generator for waterworks according to an exemplary embodiment of the present invention.

FIG. 4 is a diagram illustrating a system for controlling a water turbine generator for waterworks according to an exemplary embodiment of the present invention.

Referring to FIG. 4, the system for controlling a water turbine generator for waterworks according to an exemplary embodiment of the present invention may include an integration control system 100 and a power generation unit 200. The power generation unit 200 may include a power generation control unit 300 and a water turbine power generation unit 400.

Furthermore, the system for controlling a water turbine generator for waterworks may further include a flowmeter 500 that measures an amount of water flowing through the water turbine power generation unit 400.

The integration control system 100 may establish a driving plan (hereinafter referred to as a power generation driving plan) for generation of power by a water turbine. The integration control system 100 may control the power generation unit 200 according to the established power generation driving plan, thereby allowing the water turbine to generate power.

The integration control system 100 may transmit the power generation driving plan to the power generation control unit 300, and the power generation control unit 300 may control the water turbine power generation unit 400, thereby allowing the water turbine to generate power.

In detail, the power generation control unit 300 may control a valve connected to a water turbine generator of the water turbine power generation unit 400, thereby allowing the water turbine generator to generate power.

According to the present embodiment, it is disclosed that the integration control system 100 controls one power generation unit 200, but it can be understood by those of ordinary skill in the art that the integration control system 100 controls a plurality of power generation units.

Here, the integration control system 100 denotes a water turbine power generation system which performs real-time monitoring, predicts the demand, analyzes a pipe network, and is operated in real time in connection with an optimal algorithm.

The integration control system 100 may establish the power generation driving plan on the basis of a target amount of collected energy and a driving range of each water turbine generator, and the power generation driving plan may include a control plan (hereinafter referred to as a valve control plan) of a value connected to the water turbine generator.

Moreover, the integration control system 100 may receive an amount of water and a water pressure from a measurement apparatus that measures an amount or a pressure of water which flows into the water turbine generator of the water turbine power generation unit 400, and uses the amount of water and the water pressure in establishing the power generation driving plan.

Moreover, the integration control system 100 may receive the amount of energy (hereinafter referred to as an amount of generated power), generated by the water turbine generator of the water turbine power generation unit 400, from the water turbine generator and use the received amount of energy in establishing the power generation driving plan.

Therefore, since the integration control system 100 uses a current state of the water turbine power generation unit 400 in establishing the power generation driving plan, the integration control system 100 can be integratedly operated by performing monitoring and control in real time, and can contribute to stably generate and secure power, thereby increasing an efficiency of a water turbine generator through integrated management.

The power generation unit 200 may be controlled according to the power generation driving plan established by the integration control system 100 to generate power through generation of power by a water turbine.

As described above, the power generation unit 200 may include the power generation control unit 300 and the water turbine power generation unit 400.

The power generation control unit 300 may receive the power generation driving plan from the integration control system 100, and control the water turbine power generation unit 400 according to the power generation driving plan.

In particular, the power generation control unit 300 may control opening/closing and a degree of opening of a valve included in the water turbine power generation unit 400 according to a valve control plan of the power generation driving plan.

Moreover, the power generation control unit 300 may receive an amount of water or a water pressure which is measured by a water amount/pressure measurement apparatus of the water turbine power generation unit 400, and supply the amount of water or the water pressure to the integration control system 100.

Moreover, the power generation control unit 300 may receive an amount of generated power from the water turbine generator, and supply the amount of generated power to the integration control system 100.

Moreover, the power generation control unit 300 may receive a flow rate from the flowmeter 500 that measures an amount of water flowing through the water turbine power generation unit 400, and supply the flow rate to the integration control system 100.

The water turbine power generation unit 400 may include a branch pipeline 410 that branches from a purification plant to each home and is connected to each home, a plurality of water turbine pipelines 420 that are connected to the branch pipeline 410 in parallel, and a water turbine generator 430 that is provided in each of the plurality of water turbines 420.

That is, the water turbine power generation unit 400 has a pipe network structure in which both ends of a second water turbine pipeline 420$b$ are disposed in a first water turbine pipeline 420$a$ of which both ends are connection-disposed in the branch pipeline 410, and both ends of the third water turbine pipeline 420$c$ are disposed in the second water turbine pipeline 420$b$.

The water turbine generator 430 may be disposed in each of the first to third water turbine pipelines 420$a$ to 420$c$.

Therefore, the water turbine generator 430 may be disposed in the water turbine pipeline 420, and may generate power by using water which passes through the water turbine pipeline 420.

In this case, the water turbine generator 420 may transfer an amount of generated power to the power generation control unit 300.

The opening/closing valve 411 and the pressure reducing valve 412 may be disposed in the branch pipeline 410.

The water turbine power generation unit 400 may include a front valve 440, which is disposed at a water-inflow side (hereinafter referred to as a front end of a water turbine generator) of the water turbine generator 430, and a rear valve 450 that is disposed at a water-outflow side (hereinafter referred to as a rear end of the water turbine generator) of the water turbine generator 430.

The front valve 440 and the rear valve 450 may be controlled according to control by the power generation control unit 300, and the power generation control unit 300 may control opening/closing and a degree of opening of the front valve 440 and the rear valve 450, thereby controlling a flow of water in the water turbine pipeline 420.

Moreover, the water turbine generator 400 may further include a front measurement apparatus 460 that is disposed between the water turbine generator 430 and the front valve 440.

In this case, the front measurement apparatus 460 may measure an amount and a pressure (i.e., an amount of water and a water pressure) of water flowing into the water turbine generator 430, and transfer the amount and the pressure of water to the power generation control unit 300.

Moreover, the water turbine power generation unit 400 may further include a rear measurement apparatus 470 that is disposed at an outlet side of the rear valve 450.

In this case, the rear measurement apparatus 470 may measure an amount and a pressure (i.e., an amount of water and a water pressure) of water flowing out from the water turbine generator 430, and transfer the amount and the pressure of water to the power generation control unit 300.

Moreover, the water turbine power generation unit 400 may include a branch water turbine pipeline 480 that connects two adjacent water turbine pipelines. One end of the branch water turbine pipeline 480 is connected between the water turbine generator 430 and the front valve 440 which are disposed in a front water turbine pipeline, and the other end of the branch water turbine pipeline 480 is connected between the water turbine generator 430 and the rear valve 450 which are disposed in a rear water turbine pipeline.

The branch valve 490 may be disposed in the branch water turbine pipeline 480, and the branch valve 490 may be controlled according to control by the power generation control unit 300. The power generation control unit 300 may control opening/closing and a degree of opening of the branch valve 490 to control a flow of water in the branch water turbine pipeline 480.

If a configuration of the system for controlling a water turbine generator for waterworks according to an exemplary embodiment of the present invention is applied to a water turbine generator for waterworks, a pipe network configuring the water turbine generation unit may have a parallel structure, a serial structure, or a series and parallel combination structure by controlling the front valve and the rear valve.

Moreover, since the front valve and the rear valve which are respectively disposed at a front end and a rear end of the water turbine generator are controlled according to the power generation driving plan established by the integration control system, generation of power by the water turbine is integratedly operated, and power is stably generated and secured.

Moreover, an amount and a pressure of water flowing into the water turbine generator and an amount and a pressure of water flowing out from the water turbine generator are respectively measured in real time by the front measurement apparatus and the rear measurement apparatus, and the integration control system establishes the power generation driving plan on the basis of the amount and the pressure of water, thereby increasing an efficiency of the water turbine generator.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A system for controlling a water turbine generator for waterworks, the system comprising:
    an integration control system configured to establish a power generation driving plan, based on a target amount of energy collected by a plurality of water turbine generators and a driving range of each of the plurality of water turbine generators; and
    a power generation unit configured to:
    generate power through generation of power by a water turbine according to control based on the power generation driving plan,
    measure an amount of generated power, an amount and a pressure of water flowing into the plurality of water turbine generators, and an amount and a pressure of water flowing out from the plurality of water turbine generators, and
    supply a result of the measurement to the integration control system,
    wherein the integration control system receives and uses:
    the amount of generated power,
    the amount and the pressure of water flowing into the plurality of water turbine generators, and
    the amount and the pressure of water flowing out from the plurality of water turbine generators in establishing the power generation driving plan,
    wherein the power generation unit comprises:
    a power generation control unit configured to control generation of power by the water turbine according to the power generation driving plan; and
    a water turbine power generation unit configured to generate power according to control by the power generation control unit,
    wherein the water turbine power generation unit comprises:
    a branch pipeline connected to each home, and configured to branch from a purification plant to each home;
    a plurality of water turbine pipelines connected to the branch pipeline in parallel;
    a water turbine generator disposed in each of the plurality of water turbine pipelines; and
    a front valve and a rear valve respectively disposed at a front end and a rear end of the water turbine generator, and configured to be controlled according to control by the power generation control unit,
    wherein the water turbine power generation unit further comprises a branch water turbine pipeline configured to connect two adjacent water turbine pipelines,
    wherein one end of the branch water turbine pipeline is connected between the water turbine generator and the front valve which are disposed in a front water turbine pipeline, and the other end of the branch water turbine pipeline is connected between the water turbine generator and the rear valve which are disposed in a rear water turbine pipeline, and
    wherein the water turbine power generation unit further comprises a branch valve disposed in the branch water turbine pipeline, and configured to operate according to control by the power generation control unit.

2. The system of claim 1, wherein the water turbine power generation unit comprises:
    a front measurement apparatus disposed between the water turbine generator and the front valve, and configured to measure an amount and a pressure of water flowing into the water turbine generator; and
    a rear measurement apparatus disposed at an outlet side of the rear valve, and configured to measure an amount and a pressure of water flowing out from the water turbine generator.

3. The system of claim 1, further comprising a flowmeter disposed in the branch pipeline, and configured to measure an amount of water flowing through the water turbine power generation unit and transfer the measured amount of water to the power generation control unit.

* * * * *